(12) United States Patent
Nelson

(10) Patent No.: US 12,527,308 B2
(45) Date of Patent: Jan. 20, 2026

(54) FISHING LURE

(71) Applicant: Lloyd Nelson, Indian Rocks, FL (US)

(72) Inventor: Lloyd Nelson, Indian Rocks, FL (US)

( * ) Notice: Subject to any disclaimer, the term of this patent is extended or adjusted under 35 U.S.C. 154(b) by 374 days.

(21) Appl. No.: 17/454,625

(22) Filed: Nov. 12, 2021

(65) Prior Publication Data

US 2023/0148577 A1 May 18, 2023

(51) Int. Cl.
*A01K 85/01* (2006.01)
*A01K 85/18* (2006.01)

(52) U.S. Cl.
CPC .............. *A01K 85/01* (2013.01); *A01K 85/18* (2013.01)

(58) Field of Classification Search
CPC ...... A01K 85/01; A01K 85/18; A01K 85/019; A01K 85/015; A01K 85/1821
USPC ................................................ 43/17.6, 42.06
See application file for complete search history.

(56) References Cited

U.S. PATENT DOCUMENTS

| | | | | | |
|---|---|---|---|---|---|
| 4,630,389 | A | * | 12/1986 | Higgins ................. | A01K 85/01 43/42.22 |
| 5,155,948 | A | * | 10/1992 | Kitagawa ............... | A01K 85/00 43/42.36 |
| 5,697,182 | A | * | 12/1997 | Rodgers ................. | G04C 3/002 43/42.31 |
| 6,115,956 | A | * | 9/2000 | Firmin .................... | A01K 85/01 43/42.24 |
| 6,203,170 | B1 | * | 3/2001 | Patrick .................... | A01K 79/02 362/249.06 |
| 6,357,167 | B1 | * | 3/2002 | Bradford ................ | A01K 85/00 43/42.31 |
| 6,789,347 | B1 | * | 9/2004 | West ....................... | A01K 85/01 43/17.1 |
| 2003/0115787 | A1 | * | 6/2003 | Lindgren ............... | A01K 85/01 43/17.6 |
| 2006/0010763 | A1 | * | 1/2006 | Podlewski ............. | A01K 85/16 43/42.31 |
| 2008/0104876 | A1 | * | 5/2008 | Ito ........................... | A01K 85/16 43/42.47 |
| 2018/0045400 | A1 | * | 2/2018 | Bushee .................. | F21V 3/0625 |

FOREIGN PATENT DOCUMENTS

KR 20070041075 A * 4/2007 ............. A01K 85/01

OTHER PUBLICATIONS

KR-20070041075-A_Machine Translation (Year: 2007).*

* cited by examiner

*Primary Examiner* — Peter M Poon
*Assistant Examiner* — Sahar Almatrahi
(74) *Attorney, Agent, or Firm* — Distinct Patent Law; Justin P. Miller

(57) ABSTRACT

The fishing lure includes a head with a bell-shaped tip that collects water as the lure moves. The water is directed through channels, creating cavitation bubbles at the channel outlets. The body houses the electronics and weights. The body includes holes in the form of mock gills that allow water to enter. The water activates the electronics, causing the light to begin pulsing. The electronics include batteries and a light source—preferably an LED—with associated circuit board, within a waterproof shell or cover. In the preferred embodiment, a switch protrudes from the waterproof shell, the switch activated by water. The body also includes internal weights, the internal weights moving within channels within the body. The internal weights knock against each other within the channels, creating a clacking sound.

13 Claims, 8 Drawing Sheets

FISHING LURE

FIELD

This invention relates to the field of fishing and more particularly to a fishing lure with numerous features to attract fish.

BACKGROUND

A successful fishing trip relies on attracting fish, and encouraging the fish to bite down on a hook.

While live bait is considered by some to be ideal, it must be purchased or caught, is difficult to store, and short-lived.

Artificial lures avoid the pitfalls of live bait but lack the characteristics of live bait that fish find attractive.

What is needed is an artificial fishing lure that includes the attractive features of live bait.

SUMMARY

The fishing lure is primarily formed from a head, body, and tail.

The head is preferably rigid, connected to a flexible body and tail structure.

The head includes a bell-shaped tip that collects water as the lure moves. The water is directed through channels, creating a swirling effect and cavitation bubbles at the channel outlets.

The head is preferably replaceable, allowing a user to select a weight that best suits the desired buoyancy of the lure.

The body houses the electronics and internal weights. The body includes holes in the form of mock gills that allow water to enter. The water activates the electronics, causing the light to begin pulsing.

The electronics include batteries and a light source—preferably an LED—with associated circuit board, within a waterproof shell or cover. In the preferred embodiment, a switch protrudes from the waterproof shell, the switch activated by water. When activated the light flashes or pulses to attract fish.

The body also includes internal weights, the internal weights moving, or oscillating, within channels within the body. The internal weights knock against each other within the channel to create a clacking sound.

One or more tails attach to the body. In the preferred embodiment, there are two tails that layer over each other. This allows the user to create combinations of colors.

The fishing hook is selectable by the user and is preferably located within the tail.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
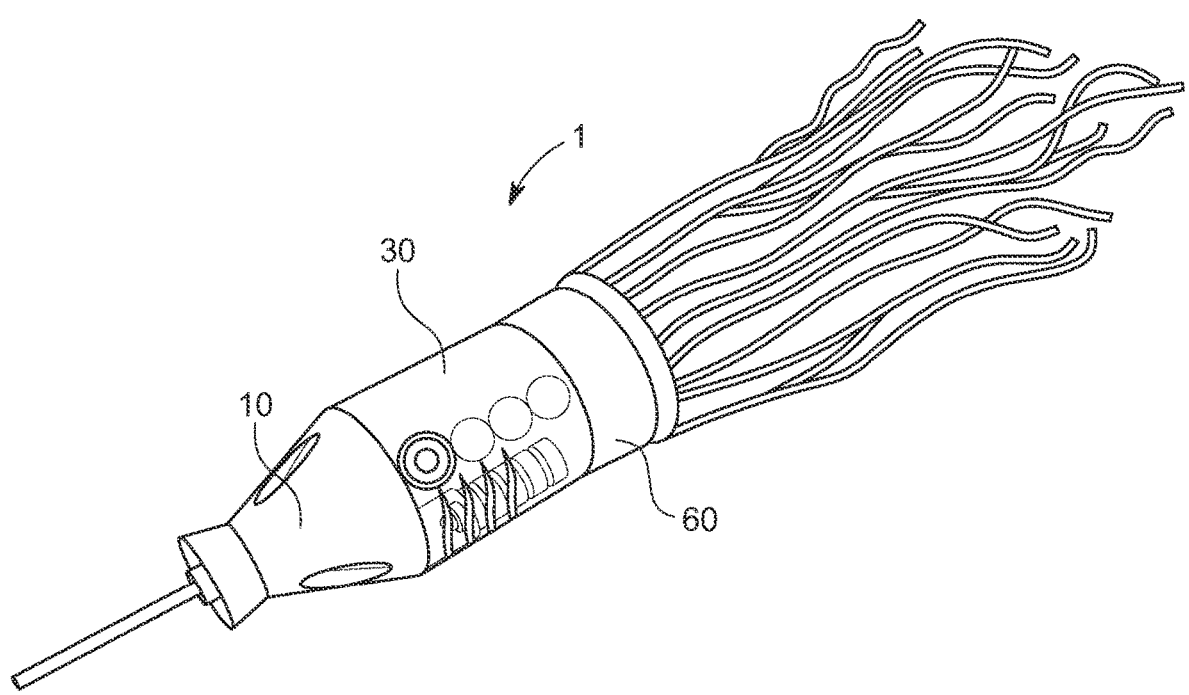
FIG. 1 illustrates a first isometric view of the fishing lure.

Reference will now be made in detail to the presently preferred embodiments of the invention, examples of which are illustrated in the accompanying drawings. Throughout the following detailed description, the same reference numerals refer to the same elements in all figures.

Referring to FIG. 1, a first isometric view of the fishing lure is shown.

The lure 1 includes primary parts head 10, body 30, and tail 60.

Figure 2:
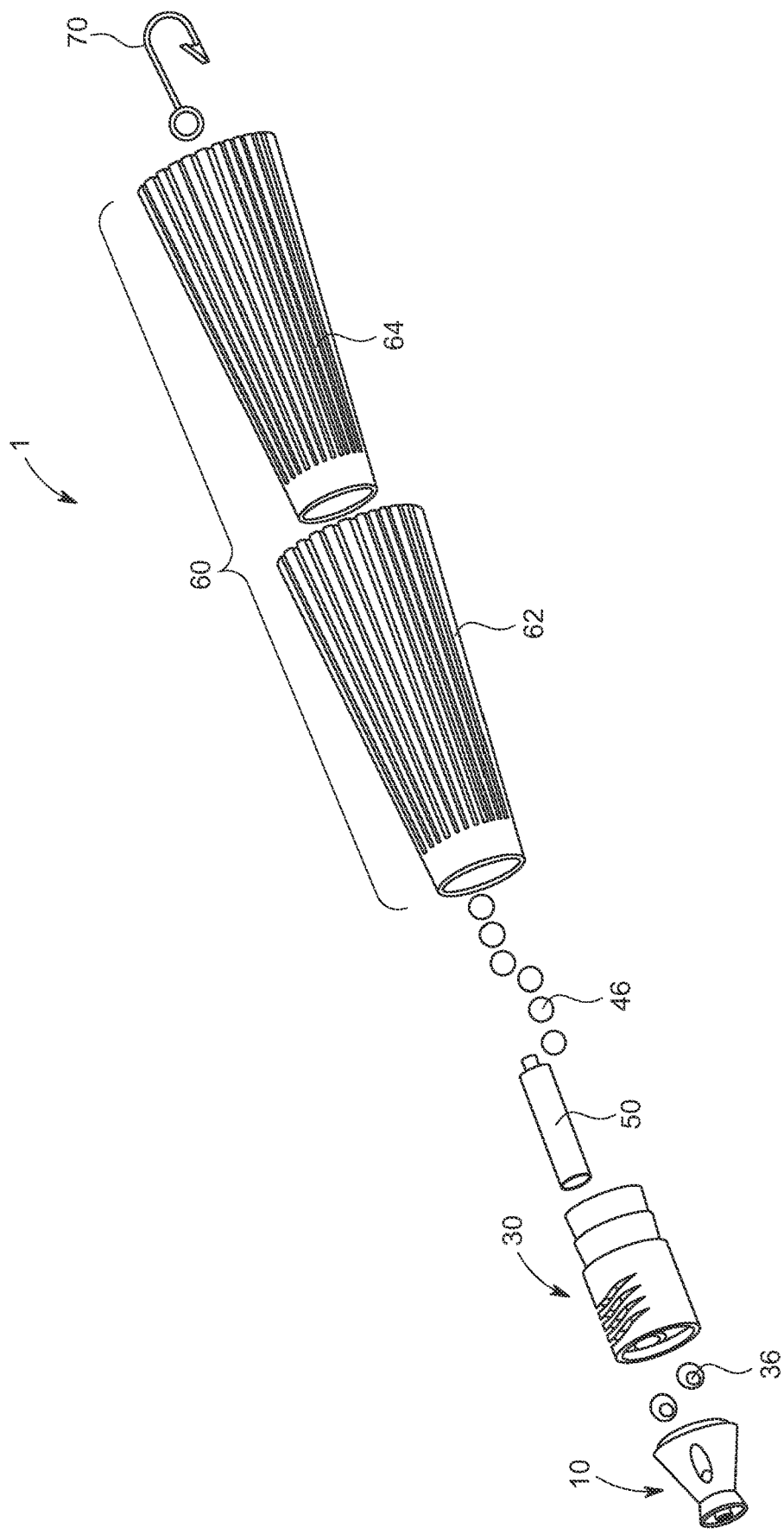
FIG. 2 illustrates an exploded isometric view of the fishing lure.

Referring to FIG. 2, an exploded isometric view of the fishing lure is shown.

The head 10 detaches from the body 30. Within the body 30 are electronics 50 and weights 46.

The tail 60, divided into an outer tail 62 and an inner tail 64, is preferably detachable from the body 30. This allows a user to customize the appearance of the lure 1.

Mock eyes 36 are attachable to the body 30 to further create the appearance of a live animal.

Figure 3:
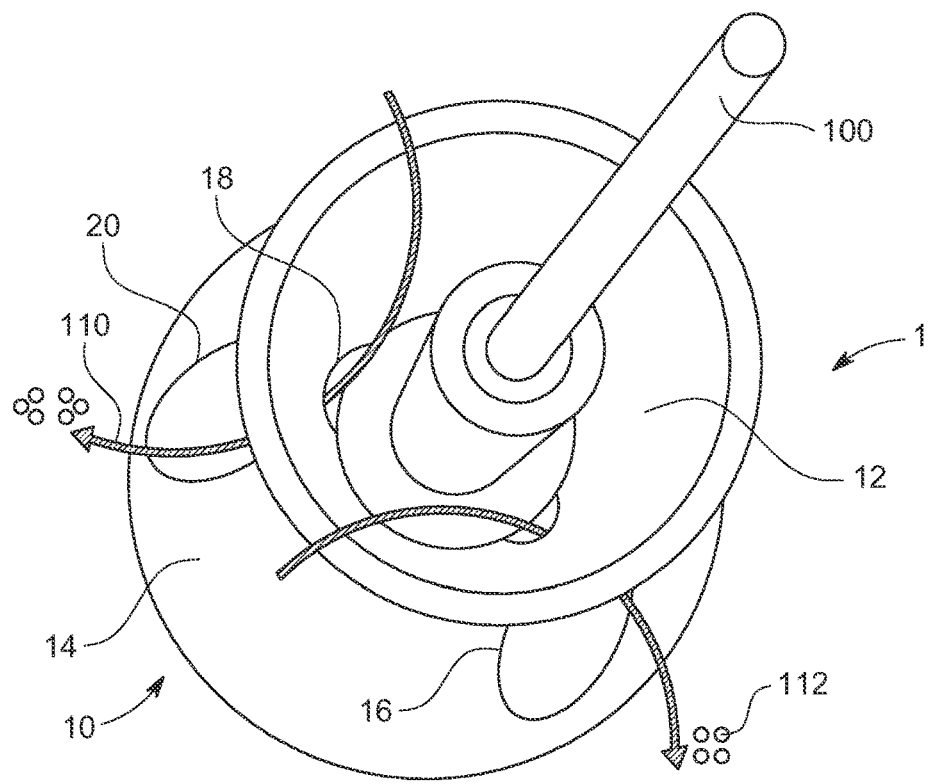
FIG. 3 illustrates a first front view of the fishing lure.
Figure 4:
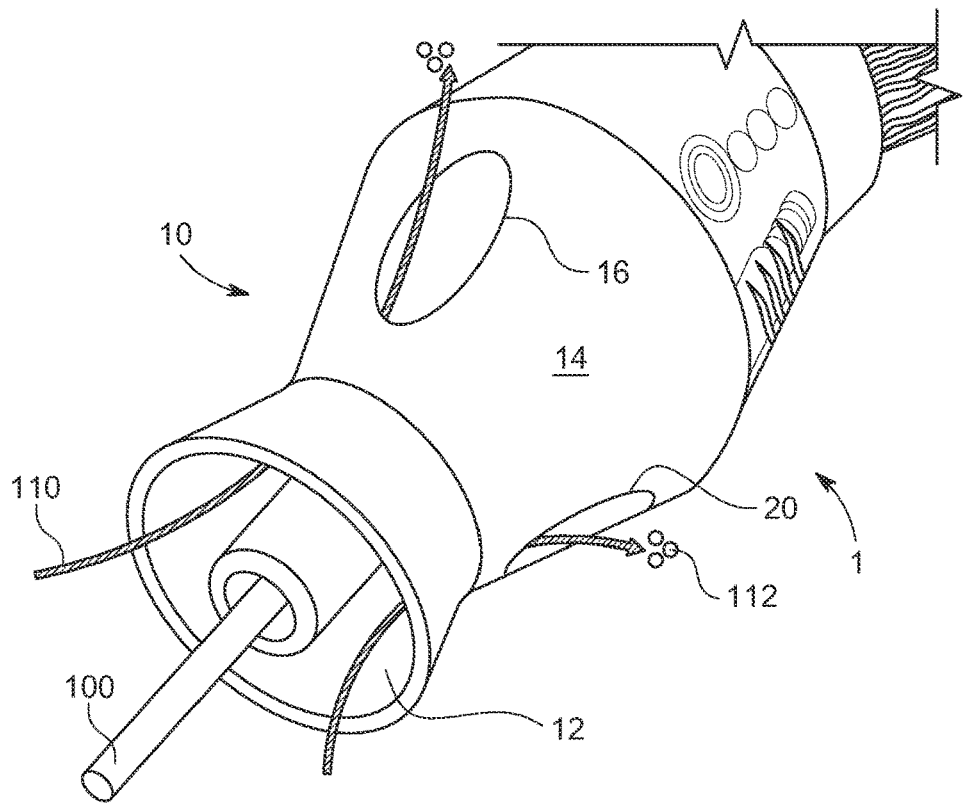
FIG. 4 illustrates a second front view of the fishing lure.

Referring to FIGS. 3 and 4, a first front view and a second front view of the fishing lure are shown.

The fishing line 100 passes through the head 10.

The head 10 includes two primary shapes: a bell-shaped tip 12 and a cone-shaped shell 14. The water 110 passes into the bell-shaped tip 12, and through the water channels 16—entering at inlet 18 and exiting at outlet 20.

Cavitation bubbles 112 are created at the outlet 20, further attracting fish.

Figure 5:
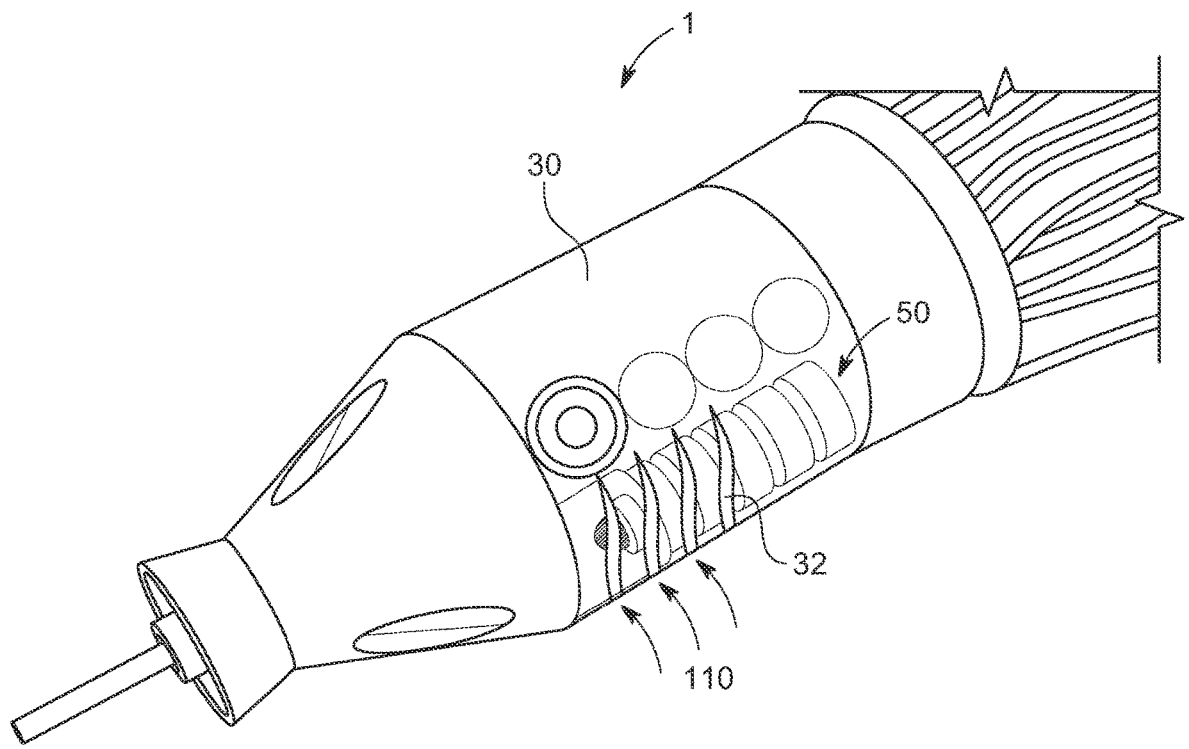
FIG. 5 illustrates a view of the head and body of the fishing lure.

Referring to FIG. 5, a view of the front and body of the fishing lure is shown.

Water 110 is drawn into the body 30 of the lure 1 via the gills, or gill slots, 32, the water 110 activating the electronics 50.

Figure 6:
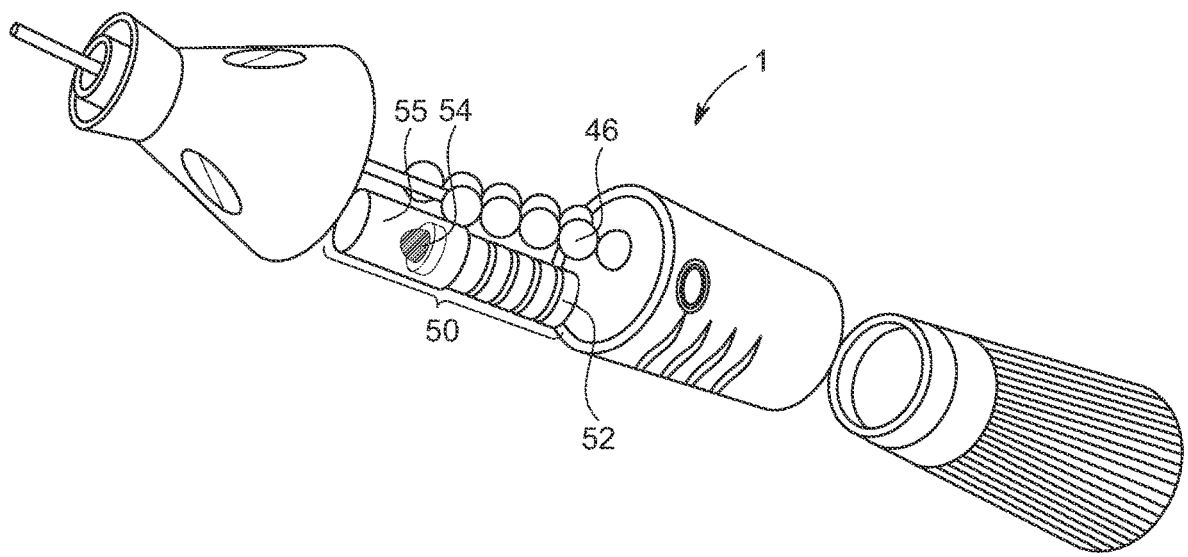
FIG. 6 illustrates a partially-exploded view of the fishing lure.

Referring to FIG. 6, a partially-exploded view of the fishing lure is shown.

The electronics 50 of the lure 1 include batteries 52, light 54, and light cover 55.

Figure 8:
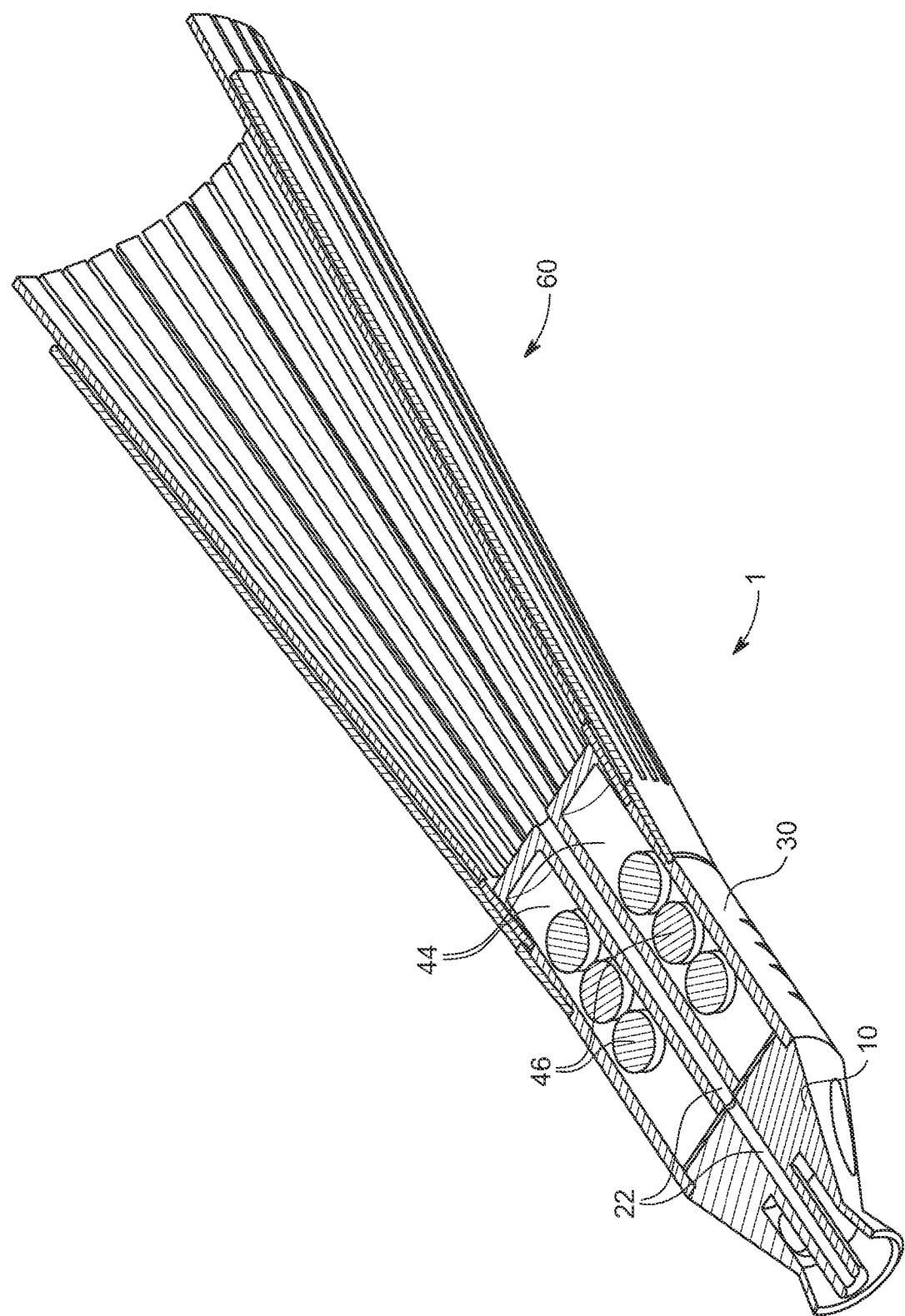
FIG. 8 illustrates a second cross-sectional view of the fishing lure.

The weights 46 move within the body 30 (see FIG. 8).

Figure 7:
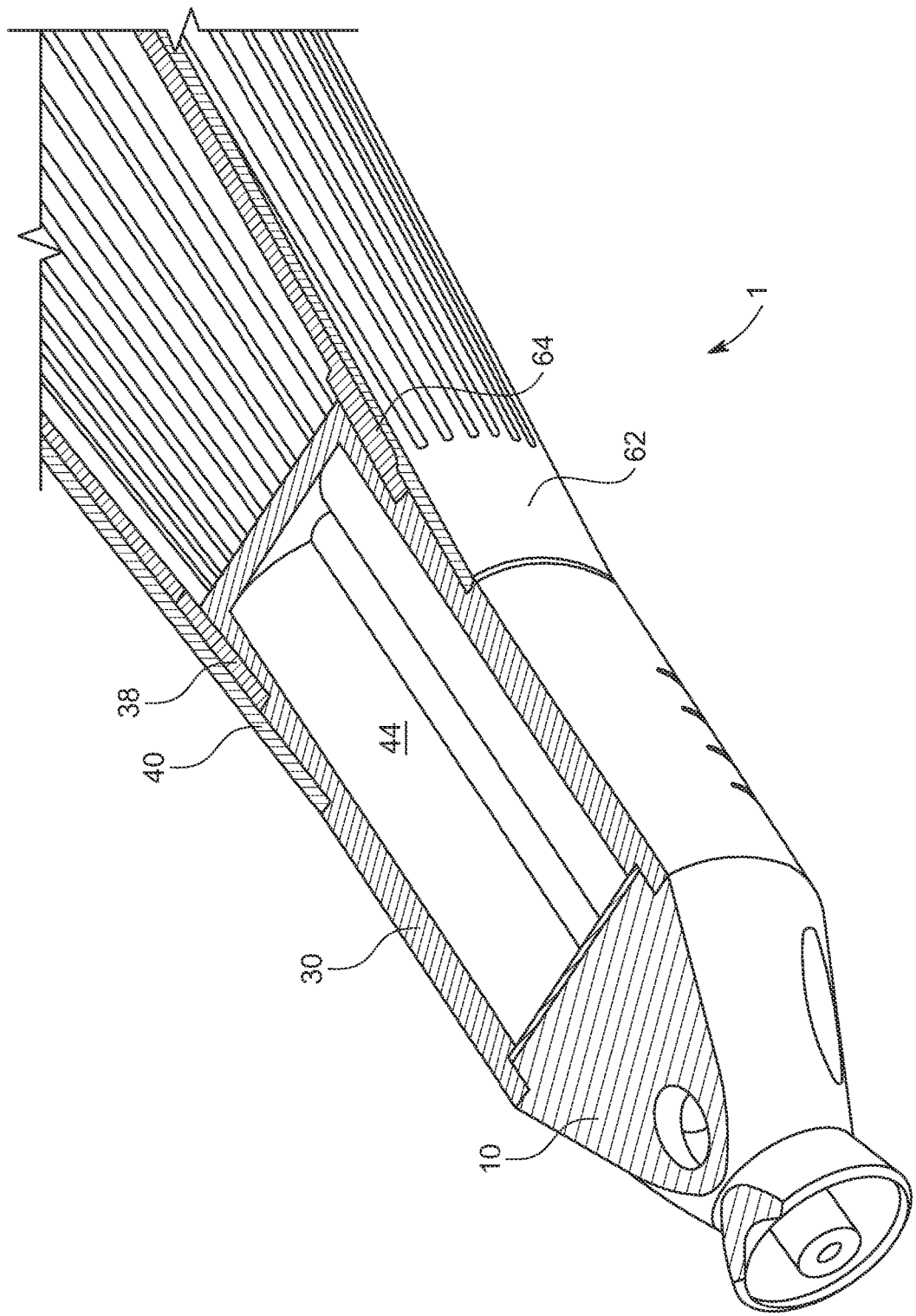
FIG. 7 illustrates a first cross-sectional view of the fishing lure.

Referring to FIG. 7, a first cross-sectional view of the fishing lure is shown.

The head 10 of the lure 1 affixes to the body 30, inside of which are internal channels 44 that hold the weights 46 (see FIG. 8).

The outer tail 62 and inner tail 64 affix to the inner tail groove 38 and the outer tail groove 40, respectively.

Referring to FIG. 8, a second cross-sectional view of the fishing lure is shown.

The line passageway 22 for fishing line 100 (see FIG. 4) is visible, passing through the head 10 and body 30, allowing a hook 70 (see FIG. 2) to be placed within the tail 60.

The internal channels 44 are longer than the weights 46, allowing the weights 46 to move back and forth, knocking against each other. This creates a sound that attracts fish.

Figure 9:
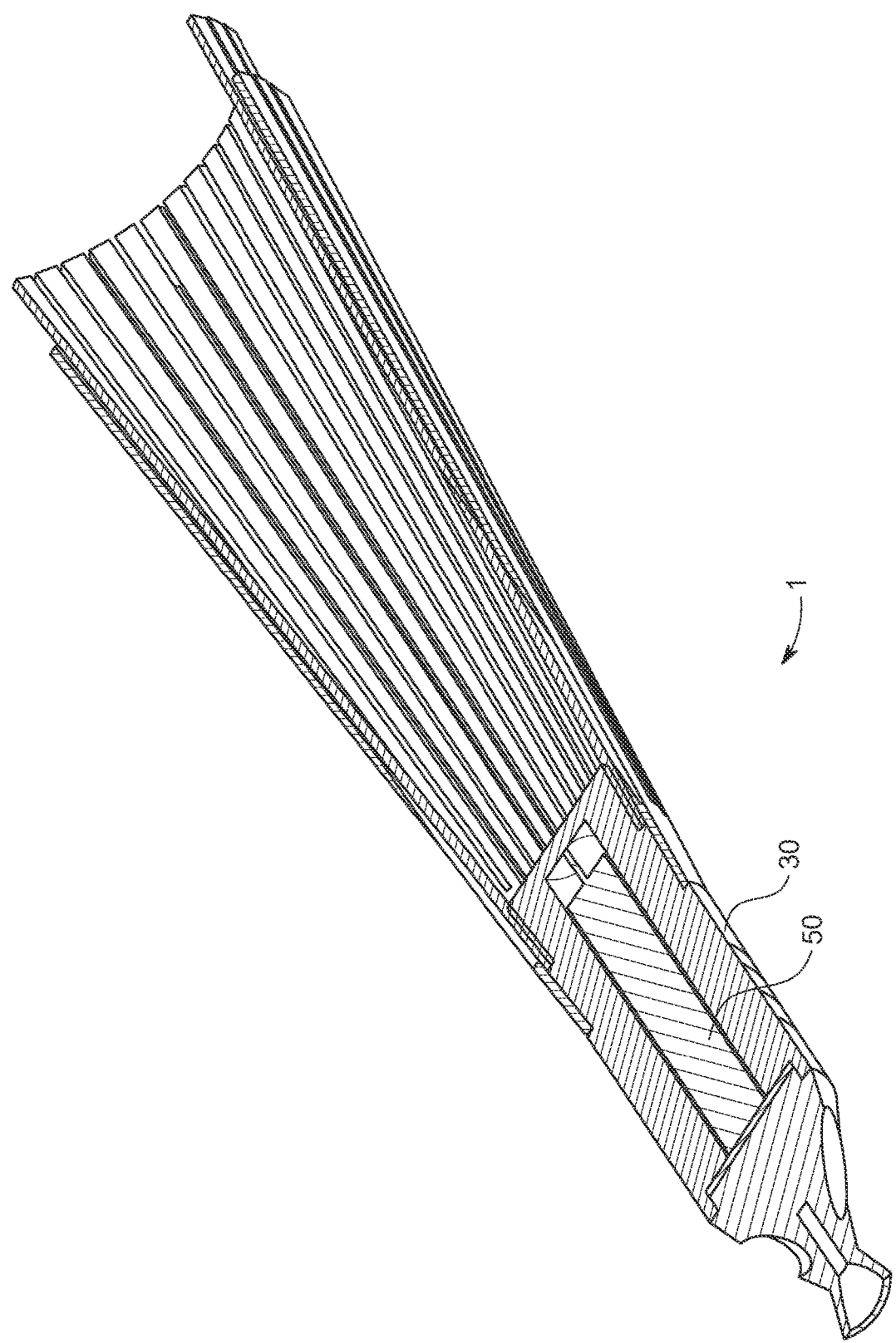
FIG. 9 illustrates a third cross-sectional view of the fishing lure.

Referring to FIG. 9, a third cross-sectional view of the fishing lure is shown.

The electronics 50 are shown within the body 30.

Figure 10:
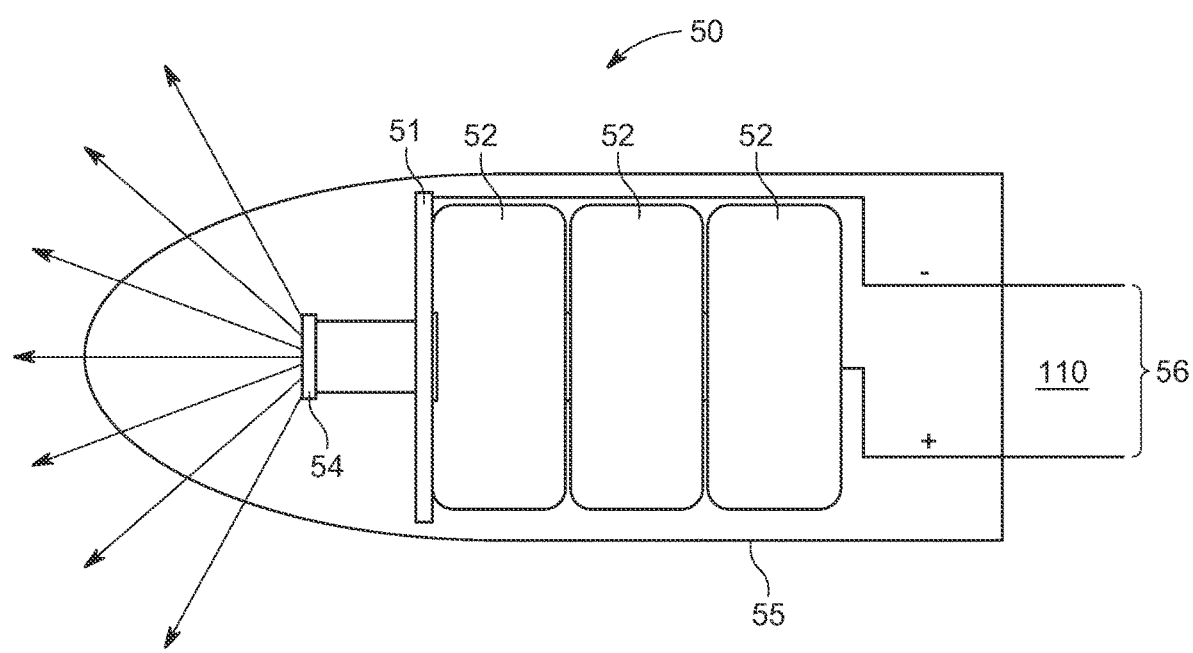
FIG. 10 illustrates a schematic view of the electronics of the fishing lure.

Referring to FIG. 10, a schematic view of the electronics of the fishing lure is shown.

The electronics 50 include a circuit board 51 with batteries 52, that power a light 54.

A cover 55 encloses the electronics 50, but for the switch 56. The switch is operated by water 110, which acts as a conductor to finish the circuit, causing the light 54 to activate.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction, and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A fishing lure comprising:
   an internal pulsing light;
      the internal pulsing light activated when water enters a body of the fishing lure;
   linear internal channels within the body;
      internal oscillating weights within the linear internal channels;
      the internal oscillating weights able to move within the linear internal channels, the internal oscillating weights knocking against each other during motion of the fishing lure to create a clacking sound;
   a head, the head removably affixed to the body;
      removal of the head allowing a user to remove the internal oscillating weights from the linear internal channels;
      the head is formed from a bell-shaped tip and a cone-shaped shell;
         the bell-shaped tip having a wide end and a narrow end;
            the narrow end adjoining the cone-shaped shell;
         one or more water channels, each with an inlet and an outlet, pass through the bell-shaped tip and the cone-shaped shell;
         the internal oscillating weights separated from the one or more water channels;
      whereby water passes through the one or more water channels, creating a swirling effect and cavitation bubbles; and
   whereby removal of the head allows access to the linear internal channels and therefore access to the internal oscillating weights.

2. The fishing lure of claim 1, wherein the internal pulsing light is associated with electronics, the electronics including:
   a circuit board;
   one or more battery;
   an LED;
   a waterproof housing;
      the circuit board, the one or more battery, and the LED within the waterproof housing;
   a switch;
      the switch protruding through the waterproof housing;
   whereby the switch is closed when water is introduced, activating the LED.

3. The fishing lure of claim 1, further comprising:
   one or more gill slots;
      the one or more gill slots creating holes through the body of the fishing lure;
      the one or more gill slots allowing water to pass into the body of the fishing lure, wherein it activates the internal pulsing light.

4. The fishing lure of claim 1, further comprising:
   a tail;
      the tail including an outer tail and inner tail;
   whereby the user can individually select the outer tail and the inner tail to best suit any desired application.

5. A fishing lure to attract fish, the fishing lure comprising:
   a body;
   an internal flashing light;
      the internal flashing light activated when water passes into the body of the fishing lure;
   two or more weights;
      the two or more weights able to move within the body of the fishing lure;
      the two or more weights clacking against each other to create a sound;
   one or more linear internal channels within the body;
      the two or more weights within the one or more linear internal channels;
      the two or more weights able to move within the one or more linear internal channels and knock against each other during motion of the fishing lure to create a clacking sound;
   a head, the head removably affixed to the body;
      removal of the head allowing a user to remove internal oscillating weights from the one or more linear internal channels;
      the head formed from a bell-shaped tip and a cone-shaped shell;
      the head includes one or more water channels, each with an inlet and an outlet, pass through the bell-shaped tip and the cone-shaped shell;
         the one or more water channels separate from the one or more linear internal channels, thereby avoiding contact between water passing through the one or more water channels and the two or more weights;
      whereby water passes through the one or more water channels, creating a swirling effect and cavitation bubbles; and
   whereby removal of the head allows access to the one or more linear internal channels and therefore access to the internal oscillating weights; and
   whereby the internal flashing light and clacking of the two or more weights act together to attract fish.

6. The fishing lure to attract fish of claim 5, wherein the internal flashing light is associated with electronics, the electronics including:
   a circuit board;
   one or more battery;
   an LED;
   a waterproof housing;
      the circuit board, the one or more battery, and the LED within the waterproof housing;
   a switch;
      the switch protruding through the waterproof housing
   whereby the switch is closed when water is introduced, activating the LED.

7. The fishing lure to attract fish of claim 5, further comprising:
- one or more gill slots;
  - the one or more gill slots creating holes through the body of the fishing lure;
  - the one or more gill slots allowing water to pass into the body of the fishing lure, wherein it activates the internal flashing light.

8. The fishing lure to attract fish of claim 6, further comprising:
- one or more gill slots;
  - the one or more gill slots creating holes through the body of the fishing lure;
  - the one or more gill slots allowing water to pass into the body of the fishing lure, wherein it activates the internal flashing light.

9. The fishing lure to attract fish of claim 5, further comprising:
- a tail;
  - the tail including an outer tail and inner tail;
- whereby a user can individually select the outer tail and the inner tail to best suit any desired application.

10. A fishing lure that uses light and sound to attract fish, the fishing lure comprising:
- a flashing light;
- internal oscillating weights;
  - the internal oscillating weights moving within a body of the fishing lure to create a sound;
  - the internal oscillating weights are within linear internal channels, the linear internal channels within the body;
  - the internal oscillating weights able to move within the linear internal channels, the internal oscillating weights knocking against each other during motion of the fishing lure to create a clacking sound;
- an interchangeable head;
  - the interchangeable head able to be removed, allowing a user to remove internal oscillating weights from the linear internal channels, and allowing a user to substitute a heavier or lighter head, thus affecting buoyancy of the fishing lure;
  - the interchangeable head is formed from a bell-shaped tip and a cone-shaped shell;
    - one or more water channels, each with an inlet and an outlet, pass through the bell-shaped tip and the cone-shaped shell;
    - the one or more water channels separated from the linear internal channels with the internal oscillating weights;
- whereby water passes through the one or more water channels, creating a swirling effect and cavitation bubbles.

11. The fishing lure that uses light and sound to attract fish of claim 10, wherein the flashing light is associated with electronics, the electronics including:
- a circuit board;
- one or more battery;
- an LED;
- a waterproof housing;
  - the circuit board, the one or more battery, and the LED within the waterproof housing;
- a switch;
  - the switch protruding through the waterproof housing
- whereby the switch is closed when water is introduced, activating the LED.

12. The fishing lure that uses light and sound to attract fish of claim 10, further comprising:
- one or more gill slots;
  - the one or more gill slots creating holes through the body of the fishing lure;
  - the one or more gill slots allowing water to pass into the body of the fishing lure, wherein it activates the flashing light.

13. The fishing lure that uses light and sound to attract fish of claim 11, further comprising:
- one or more gill slots;
  - the one or more gill slots creating holes through the body of the fishing lure;
  - the one or more gill slots allowing water to pass into the body of the fishing lure, wherein it activates the flashing light.

* * * * *